(No Model.)  
2 Sheets—Sheet 1.

J. S. LONG.
WATER GAGE.

No. 595,320. Patented Dec. 14, 1897.

WITNESSES  
James F. Duhamel  
A. W. Poynter

INVENTOR,  
JOSEPH S. LONG,  
By John Wedderburn  
Attorney (No Model.) 2 Sheets—Sheet 2.

J. S. LONG.
WATER GAGE.

No. 595,320. Patented Dec. 14, 1897.

WITNESSES
INVENTOR,
JOSEPH S. LONG,
Attorney

UNITED STATES PATENT OFFICE.

JOSEPH S. LONG, OF PURSELL, MISSOURI.

WATER-GAGE.

SPECIFICATION forming part of Letters Patent No. 595,220, dated December 14, 1897.

Application filed February 20, 1897. Serial No. 624,409. (No model.)

*To all whom it may concern:*

Be it known that I, JOSEPH S. LONG, a citizen of the United States, residing at Pursell, in the county of McDonald and State of Missouri, have invented certain new and useful Improvements in Gages; and I do hereby declare the following to be a full, clear, and exact description of the invention, such as will enable others skilled in the art to which it appertains to make and use the same.

My invention relates to certain new and useful improvements in liquid-gages, the object being to provide a novel form of gage for attachment to a barrel or vessel adapted to indicate the amount of liquid therein at the outset, the amount of liquid subsequently drawn off, and the amount remaining in the said barrel or vessel.

To this end my invention consists of a hollow gage-body having a stem or shank for insertion into the barrel or vessel, an indicating-face or a plural number of indicating-faces bearing thereon indicating-figures ranging from zero to the figure designating the capacity in number of gallons of the barrel or vessel on which it is intended to use it, a float moving in said body, and a movable gage indicating-pointer carried by the float and adapted to indicate the quantity of liquid contained in the vessel and the quantity withdrawn therefrom.

My invention also consists in certain other novel constructions, combinations, and arrangements of parts, as will be hereinafter more fully described and specifically claimed.

Figure 1:
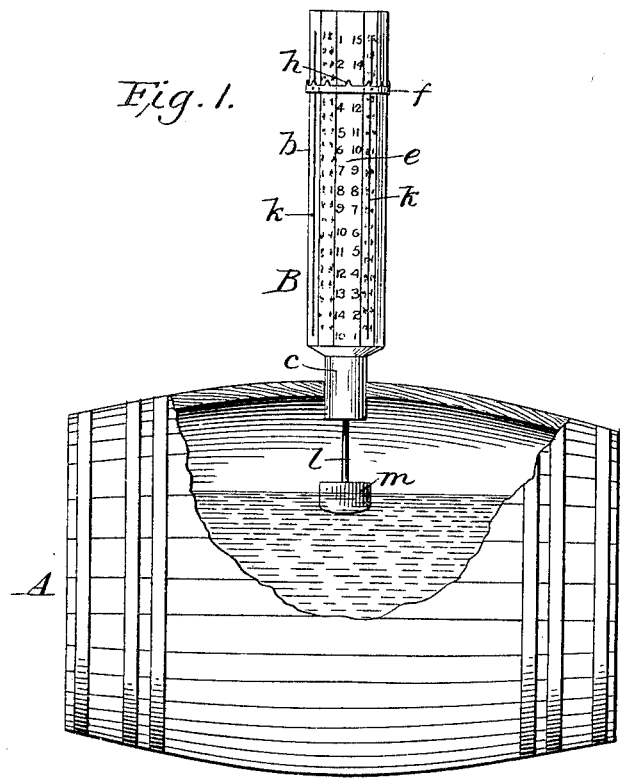
Figure 2:
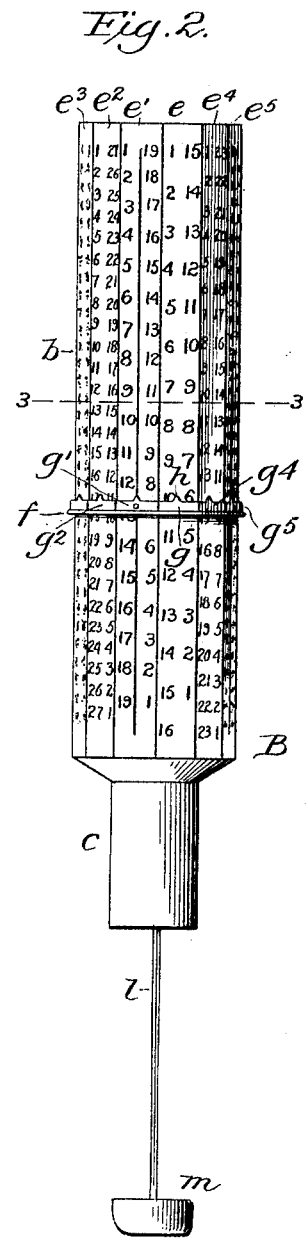
Figure 3:
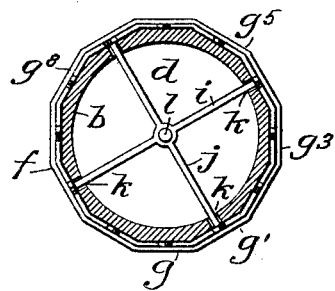
Figure 4:
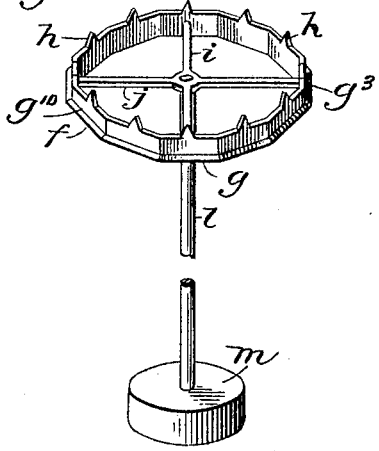

In the accompanying drawings, Figure 1 is a part sectional and a part elevational view of a barrel, showing the gage applied thereto. Fig. 2 is an elevation view of the gage on an enlarged scale. Fig. 3 is a horizontal section of the gage on line 3 3 of Fig. 2. Fig. 4 is an enlarged detail perspective view of the float and gage indicating-pointer and parts.

Referring to the drawings, the letter A designates a barrel to which, for the purpose of illustration, the gage is shown applied. The gage B comprises a body $b$, having a stem or shank $c$ for insertion into the bung-hole of a barrel or opening in a vessel, and a vertical passage $d$ through it and the said shank. The gage-body has a suitable number of exterior indicating-faces $e$ $e'$ $e^2$, &c., each bearing indicating-numerals thereon. In the present instance the gage is shown provided with twelve indicating-faces each bearing a different set of numerals, whereby it is adapted for use upon twelve different sizes of barrels or vessels. The gage may have only a single indicating-face, if desired. The set of numerals on each face are arranged in two columns, that on the left-hand side, extending from the top downward, designating the quantity of liquid drawn from the vessel, and the corresponding column on the right-hand side designating the amount left therein. For instance, the face $e$ is intended for use with a vessel of sixteen-gallon capacity. The left-hand column of numerals on this face, reading downward, range from "1" to "15," while the corresponding column of numerals on the right-hand side are the reversal thereof, ranging from "15" to "1." The columns of numerals on the other faces are likewise arranged, except that the numerals thereof vary correspondingly with the capacity of the vessel for which it is intended.

The gage mechanism consists of an indicating-band $f$, surrounding the staff or body $b$, and provided with corresponding faces $g$ $g'$ $g^2$, &c., each having an indicating-point $h$ to point to corresponding numerals of the two columns of figures on the staff-face before referred to. This band $f$ is carried by two crossed rods $i$ $j$, whose ends project from the passage $d$ through four guide-slots $k$ in the staff and are connected with said band. A plunger $l$ is attached to the said rods at the crossing-point thereof and carries at its lower end a float $m$, which is movable up and down in the said vertical passage $d$.

When the gage stem or shank $c$ is inserted in a vessel-opening or the bung-hole of a barrel, as shown in Fig. 1, the liquid contents of the said barrel acting on the float forces the latter up, and the gage carried thereby indicates the quantity of said liquid. For instance, if the gage is applied to a sixteen-gallon barrel, the gage-band would be lifted to the highest point on the face $e$, and when a gallon of liquid is drawn from said barrel the said band will drop down and the pointer $h$ thereof will register with the column-numerals "1" to "15," indicating thereby that a gallon of liquid has been withdrawn and fifteen gallons remain in the barrel.

My invention provides a simple and effective device which is not liable to get out of order. By its use the amount of liquid contained in a barrel of a given capacity may be readily ascertained without the necessity of drawing off and measuring said liquid.

Having thus described my invention, what I claim as new, and desire to secure by Letters Patent, is—

1. In liquid-gages, the combination of a stock provided with a reduced stem adapted to fit within a vessel-opening, said stock being provided also with a series of angularly-disposed indicating-faces each bearing two columns of gage-numerals reading downward, one being a reversal in figures of the other, a float projecting below the stem, a rod extending up from the float, and an indicating-band surrounding the stock and provided with pointers, said band being connected with the float-rod, substantially as described.

2. In liquid-gages, the combination of a stock provided with a reduced stem adapted to fit within a vessel-opening, said stock being provided also with a series of angularly-disposed indicating-faces each bearing two columns of gage-numerals reading downward, one being a reversal in figures of the other, and longitudinal slots, a float below the stem and limited in movement thereby, a rod projecting up from the float and carrying at its upper end two cross-bars $i, j$, whose ends project through said slots, and an indicating-band corresponding in configuration to and surrounding the stock and provided with indicating-pointers, said pointers being connected with the ends of the cross-bars, substantially as described.

In testimony whereof I have signed this specification in the presence of two subscribing witnesses.

JOSEPH S. LONG.

Witnesses:
JAMES W. BROCK,
M. D. BRODLEY.